(12) United States Patent
KIM et al.

(10) Patent No.: US 10,722,064 B2
(45) Date of Patent: Jul. 28, 2020

(54) ELECTRIC COOKER

(71) Applicant: CUCKOO ELECTRONICS CO., LTD., Yangsan-si (KR)

(72) Inventors: WON YOUNG KIM, Busan (KR); SEUNG YUN KIM, Busan (KR); SOO HO SON, Busan (KR); HO SANG BANG, Busan (KR); YOUNG BAE SHIN, Yangsan-si (KR)

(73) Assignee: CUCKOO ELECTRONICS CO., LTD., Yangsan-si (KR)

(*) Notice: Subject to any disclaimer, the term of this patent is extended or adjusted under 35 U.S.C. 154(b) by 175 days.

(21) Appl. No.: 16/012,847

(22) Filed: Jun. 20, 2018

(65) Prior Publication Data

US 2019/0008316 A1    Jan. 10, 2019

(30) Foreign Application Priority Data

Jul. 10, 2017   (KR) .......................... 10-2017-0087323

(51) Int. Cl.
*A47J 27/08*      (2006.01)
*A47J 27/092*    (2006.01)

(52) U.S. Cl.
CPC ....... *A47J 27/0813* (2013.01); *A47J 27/0802* (2013.01); *A47J 27/092* (2013.01)

(58) Field of Classification Search
CPC .... A47J 28/08; A47J 27/0802; A47J 27/0806; A47J 27/0813; A47J 27/092; A47J 27/08
USPC .................... 99/337; 219/340, 331, 440, 431
See application file for complete search history.

(56) References Cited

U.S. PATENT DOCUMENTS

| 8,544,381 | B2 * | 10/2013 | Cartigny ............. A47J 27/0813 219/440 |
| 9,018,566 | B2 | 4/2015 | Wang |
| 2006/0054026 | A1 * | 3/2006 | Seurat Guiochet ... A47J 27/092 99/337 |
| 2008/0290092 | A1 * | 11/2008 | de Bastos Reis Portugal ............. A47J 27/0813 220/321 |
| 2015/0068409 | A1 | 3/2015 | Tanaka et al. |
| 2016/0100707 | A1 | 4/2016 | Huang |

(Continued)

FOREIGN PATENT DOCUMENTS

| CN | 101554288 | 10/2009 |
| JP | 2015-180289 | 10/2015 |
| KR | 20-1998-0035053 | 9/1998 |

(Continued)

*Primary Examiner* — Reginald Alexander
(74) *Attorney, Agent, or Firm* — Lex IP Meister, PLLC

(57) ABSTRACT

An electric cooker is configured to cook in a pressure state and a non-pressure state of an inner pot, thereby improving the cooking quality and convenience of use. The electric cooker includes a main body configured to accommodate an inner pot; a lid coupled to an upper portion of the main body and having a handle portion provided at one side of an upper portion of the lid to interwork with an inner pot locking unit configured to lock the inner pot; a pressure switching unit arranged to pass through the lid and configured to switch or maintain an opened or closed state to discharge internal steam from the inner pot according to a rotation of the handle portion; and a pressure-responsive operating unit which is selectively opened or closed according to a pressure inside the inner pot in a pressure cooking mode in which the pressure switching unit is closed.

19 Claims, 9 Drawing Sheets

(56) References Cited

U.S. PATENT DOCUMENTS

2016/0278564 A1    9/2016    Huang

FOREIGN PATENT DOCUMENTS

| | | | |
|---|---|---|---|
| KR | 10-2006-0016070 | 2/2006 | |
| KR | 10-2006-0099548 | 9/2006 | |
| KR | 1020090096991 | 9/2009 | |
| KR | 20-0450045 | 9/2010 | |
| KR | 10-2012-0000164 | 1/2012 | |
| KR | 10-2013-0032709 | 4/2013 | |
| WO | WO-2011128579 A1 * | 10/2011 | .......... A47J 27/0802 |

* cited by examiner

ELECTRIC COOKER

CROSS-REFERENCE TO RELATED APPLICATION

This application claims the benefit of Korean Application No. 10-2017-0087323 which was filed on Jul. 10, 2017, which was hereby incorporated by reference as if fully set forth herein.

BACKGROUND

1. Field of the Invention

The present disclosure relates to an electric cooker, and more specifically, to an electric cooker configured to cook in a pressure state and a non-pressure state of an inner pot, thereby improving the cooking quality and convenience of use.

2. Discussion of Related Art

In general, an electric cooker refers to an electric rice cooker, an electric pressure cooker, or the like used for cooking food in a restaurant or at home, and includes a main body having a heating unit and a lid covering a top of the main body.

An inner pot for receiving food is accommodated in the main body, the lid is hinged to one side of the main body such that the lid can be opened and closed, and an inner pot cover is provided at a bottom of the lid to seal an opening of the inner pot. A flow hole configured to communicate with an inside of the inner pot may be formed at one side of the inner pot cover, and steam generated in the inner pot may flow to a pressure-adjusting unit provided in the lid through the flow hole.

In detail, the pressure-adjusting unit may include a solenoid valve electrically driven to open or close a steam discharge passage that connects the inside of the inner pot to the outside of the cooker, and a pressure relief valve for maintaining an internal pressure of the inner pot at a predetermined level. That is, when the cooking is started, the steam discharge passage is closed by the solenoid valve so that the internal pressure of the inner pot is increased, and the internal pressure of the inner pot can be maintained at a predetermined level through the pressure relief valve.

However, since the conventional electric cooker maintains the internal pressure of the inner pot at a predetermined level throughout the interaction between a weight pressure of the pressure relief valve and a steam pressure, it is difficult to select a cooking mode suitable for a user's taste or the type of foodstuffs and thus the cooking quality is degraded.

That is, in the case of a food material which does not need to be pressurized, there is a problem wherein the texture of food is softened due to the high pressure. Meanwhile, when non-pressure cooked rice having a soft texture is preferred more than pressure cooked rice having a sticky texture, there is a problem wherein it is necessary to separately cook a food by using a non-pressurized electric rice cooker or a common pot.

Thus, in order to provide the rice having the soft texture, the solenoid valve is frequently opened for a predetermined time/cycle in the cooking process, the thermal power is reduced or the rice is soaked in water for a long time. However, the taste of the rice does not reach the level of the taste of rice cooked with the non-pressure electric rice cooker.

Further, when a pressure exists in the inner pot during the cooking, it is impossible to open the lid to check a cooking state or to insert additional materials due to a pressure safety device configured to prevent the lid from being opened under the high pressure state of the inner pot, thereby causing inconvenience to a user.

SUMMARY OF THE INVENTION

The present disclosure is directed to an electric cooker configured to cook a food in a pressure state and a non-pressure state of an inner pot, thereby improving the cooking quality and convenience of use.

According to an aspect of the present disclosure, there is provided an electric cooker including: a main body configured to accommodate an inner pot; a lid coupled to an upper portion of the main body and having a handle portion provided at one side of an upper portion of the lid to interwork with an inner pot locking unit configured to lock the inner pot; a pressure switching unit arranged to pass through the lid and configured to switch or maintain an opened or closed state to discharge internal steam from the inner pot according to a rotation of the handle portion; and a pressure-responsive operating unit which is selectively opened or closed according to a pressure inside the inner pot in a pressure cooking mode in which the pressure switching unit is closed.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Exemplary embodiments of the present disclosure will be described in detail below with reference to the accompanying drawings. While the present disclosure is shown and described in connection with the exemplary embodiments, it will be apparent to those skilled in the art that various modifications can be made without departing from the spirit and scope of the disclosure.

Hereinafter, an electric cooker according to an exemplary embodiment of the present disclosure will be described in detail with reference to the accompanying drawings.

Figure 1:
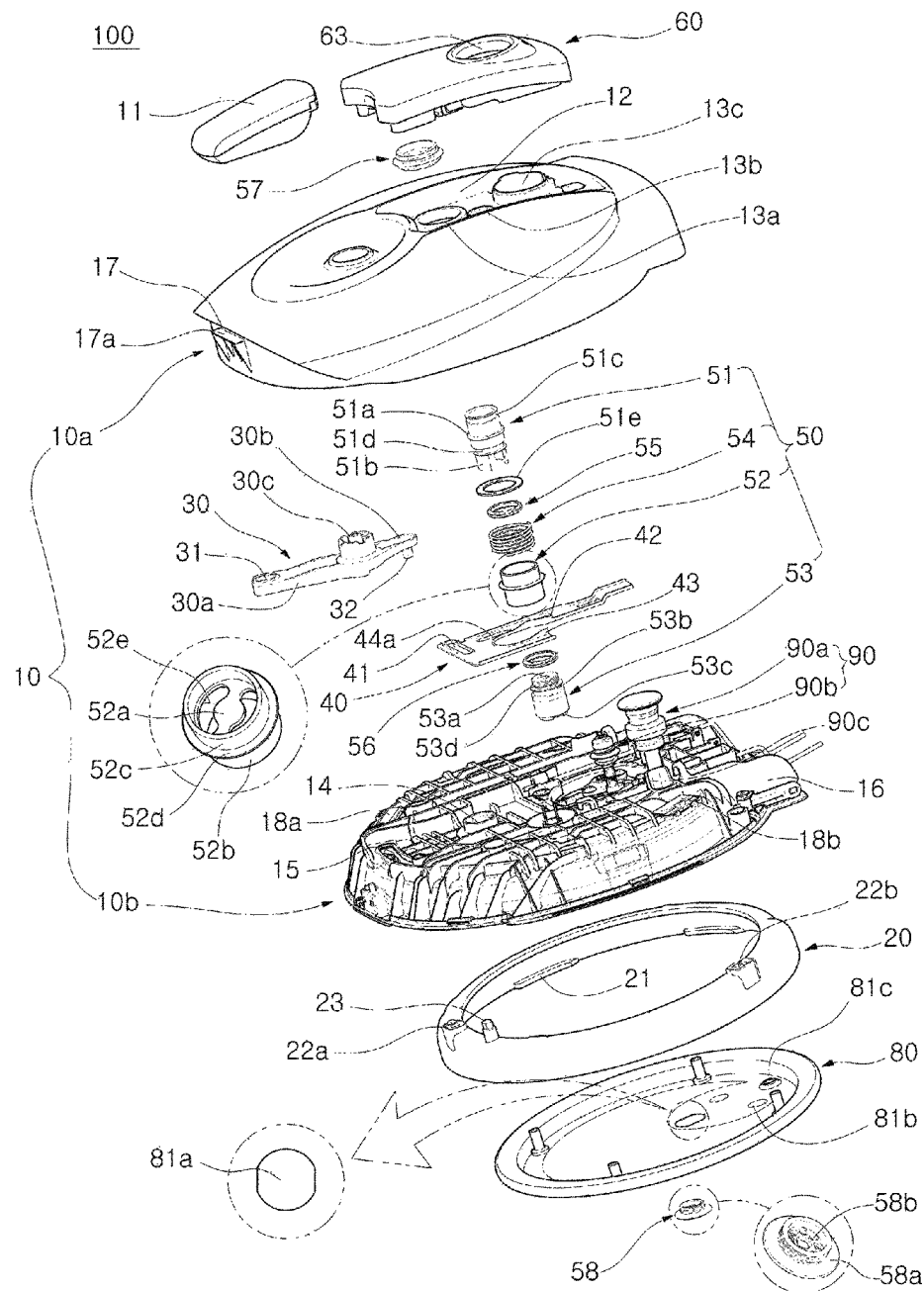
FIG. 1 is an exploded perspective view illustrating a lid of an electric cooker according to a first embodiment of the present disclosure.
Figure 2A:
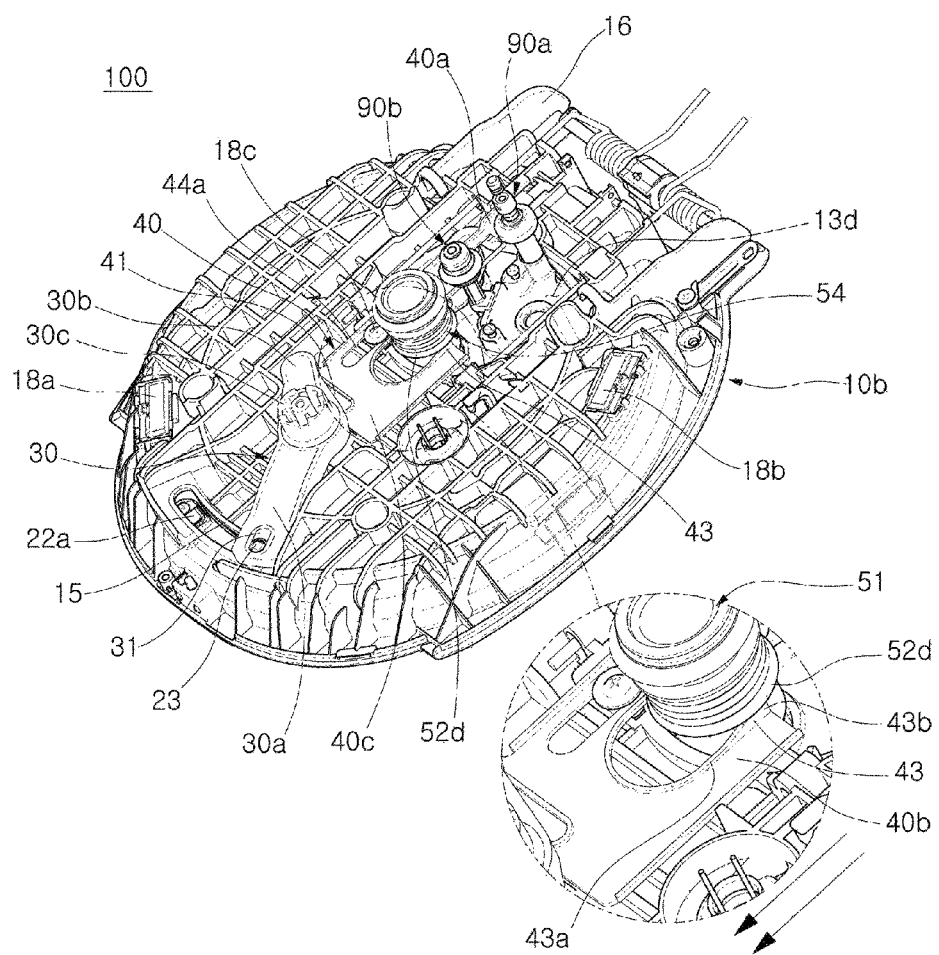
FIGS. 2A and 2B are perspective views illustrating opened and closed states of a pressure switching unit of the electric cooker according to the first embodiment of the present disclosure.
Figure 2B:
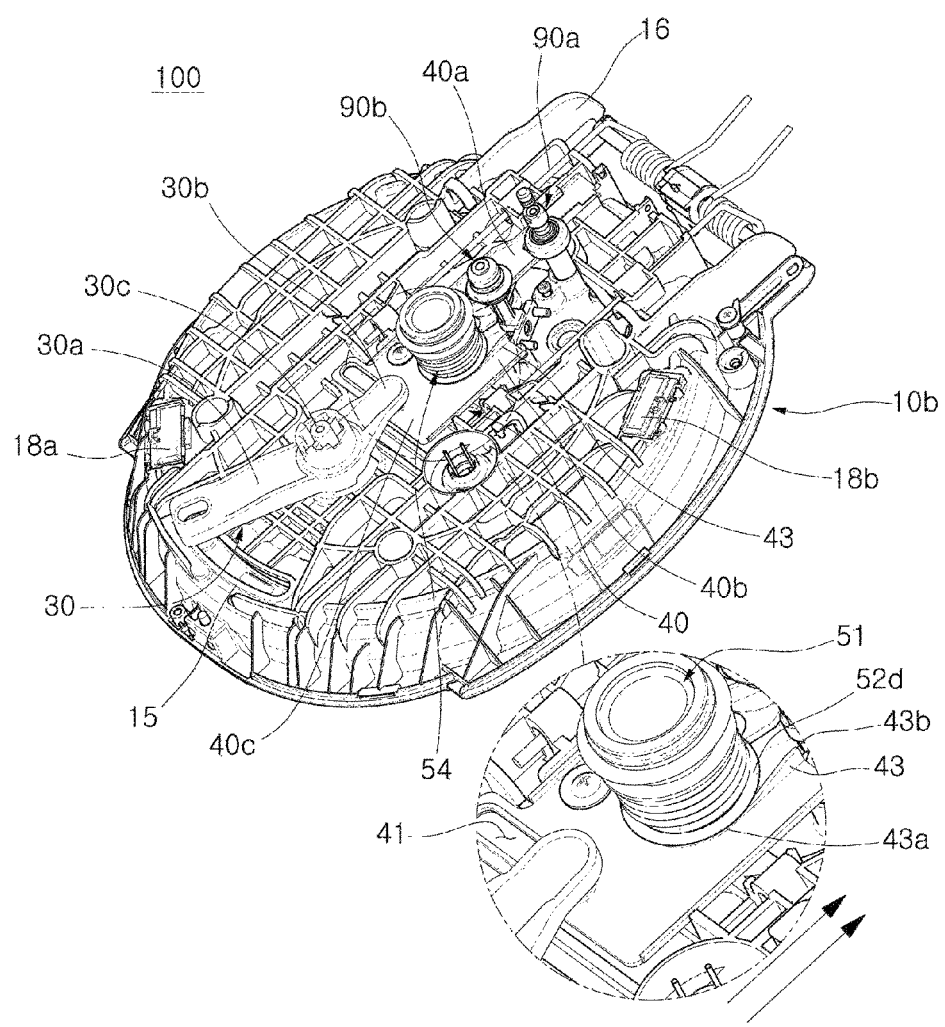
Figure 3A:
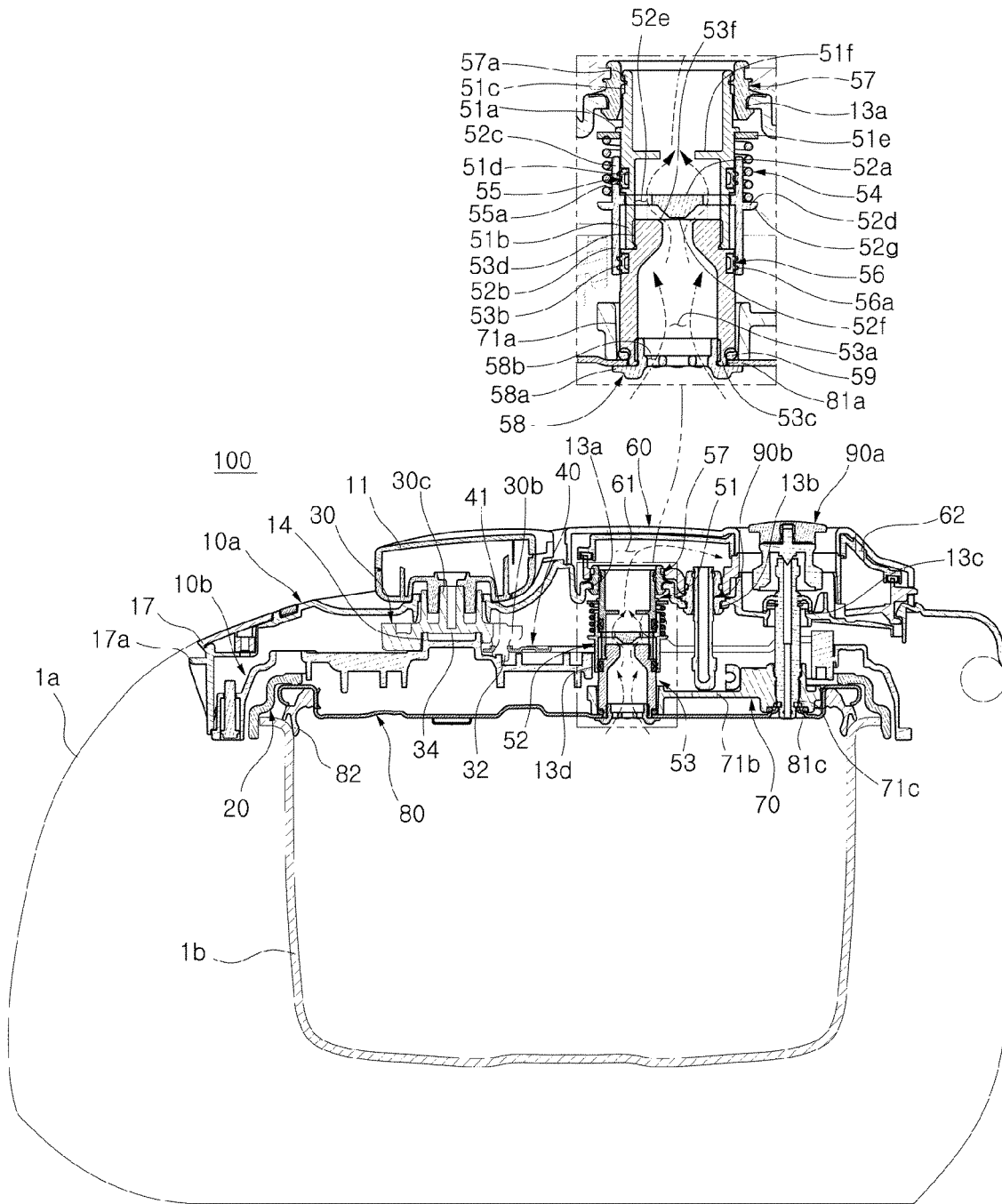
FIGS. 3A and 3B are sectional views illustrating opened and closed states of the pressure switching unit of the electric cooker according to the first embodiment of the present disclosure.
Figure 3B:
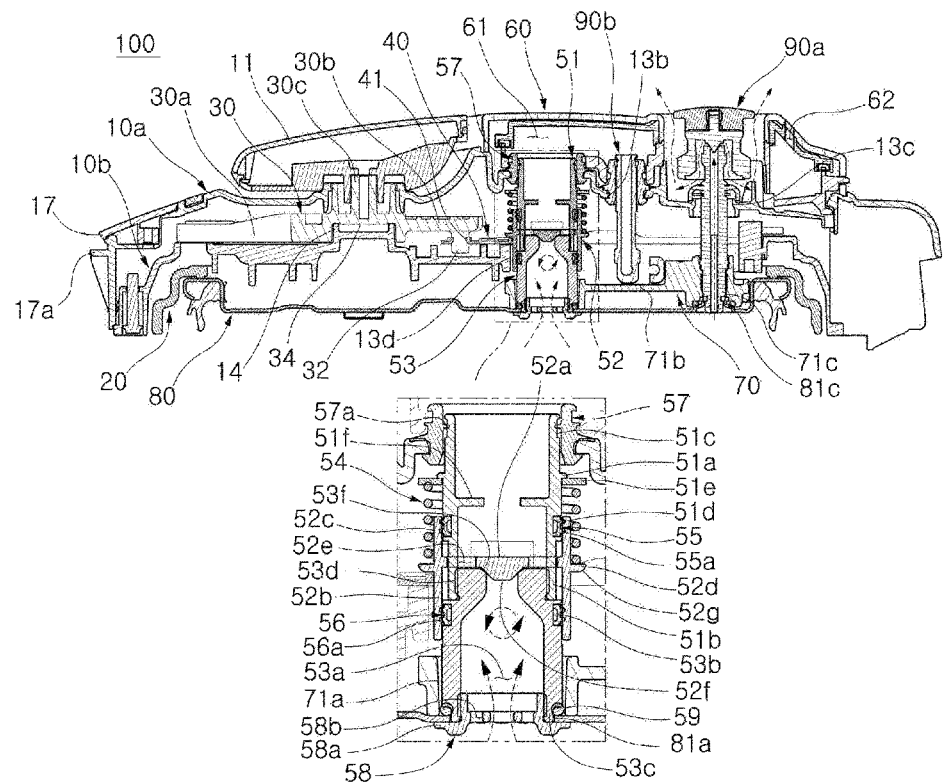
Figure 4:
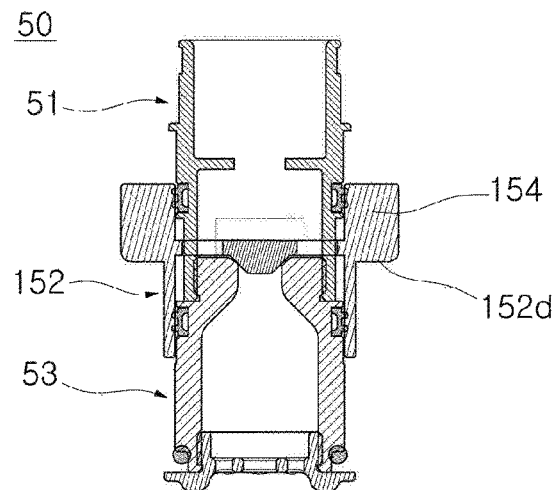
FIG. 4 is a view illustrating a modified example of a pressing unit of the electric cooker according to the first embodiment of the present disclosure.
Figure 5:
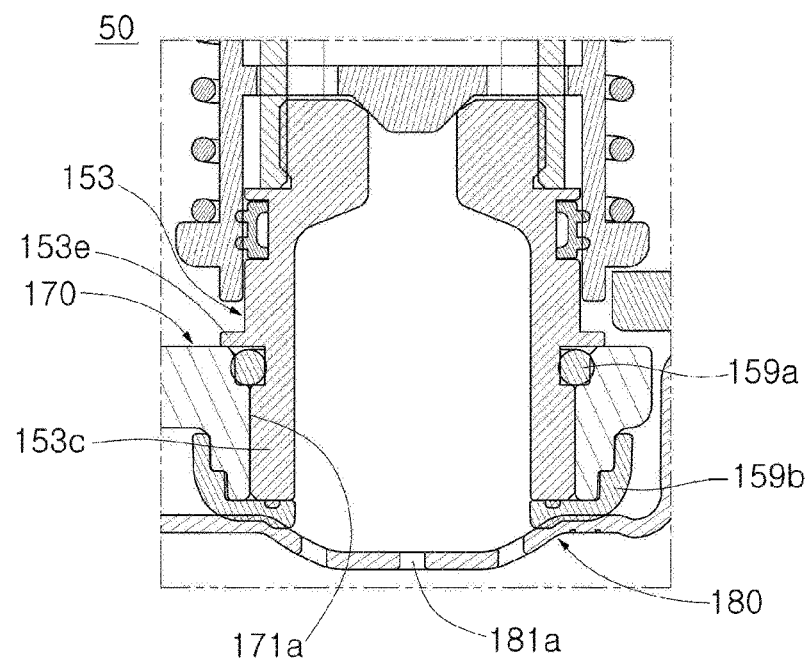
FIG. 5 is a view illustrating a modified example of a coupling structure of a lower cylinder of the electric cooker according to the first embodiment of the present disclosure.
Figure 6:
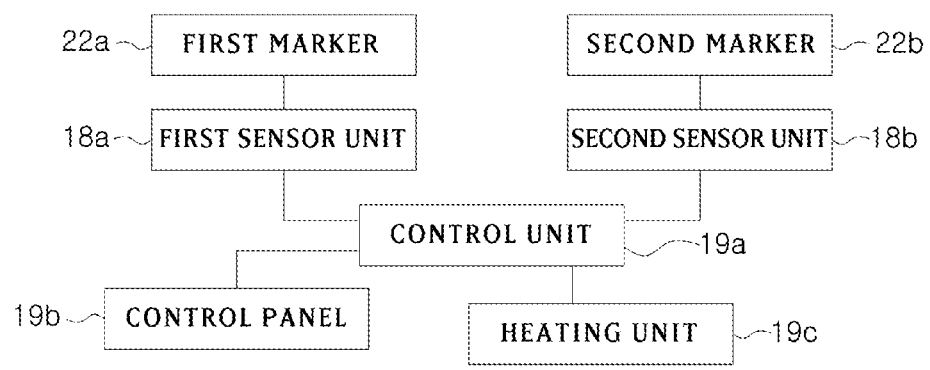
FIG. 6 is a block diagram illustrating the electric cooker according to the first embodiment of the present disclosure.

FIG. 1 is an exploded perspective view illustrating a lid of an electric cooker according to a first embodiment of the present disclosure, FIGS. 2A and 2B are perspective views illustrating opened and closed states of a pressure switching unit of the electric cooker according to the first embodiment of the present disclosure, FIGS. 3A and 3B are sectional views illustrating opened and closed states of the pressure switching unit of the electric cooker according to the first embodiment of the present disclosure, FIG. 4 is a view illustrating a modified example of a pressing unit of the electric cooker according to the first embodiment of the present disclosure, FIG. 5 is a view illustrating a modified example of a coupling structure of a lower cylinder of the electric cooker according to the first embodiment of the present disclosure, and FIG. 6 is a block diagram illustrating the electric cooker according to the first embodiment of the present disclosure.

As shown in FIGS. 1 to 6, an electric cooker 100 according to the embodiment of the present disclosure includes a main body 1a, a lid 10, a pressure-responsive operating unit 90, and a pressure switching unit 50.

A mounting space is formed in the main body 1a, and a heating unit 19c such as a heat plate heater or an induction heating unit is provided in the mounting space. An inner pot 1b for receiving food is mounted in the mounting space. A plurality of flange portions protrude radially outward from an upper end of the inner pot 1b.

Meanwhile, referring to FIGS. 1 and 2A, the lid 10 is coupled to an upper portion of the main body 1a so as to be opened and closed and includes an inner lid portion 10b in which various electrical components and wirings are installed, and an outer lid portion 10a covering the inner lid portion 10b and having a handle portion 11 at one side of an upper surface thereof. The handle portion 11 is illustrated as an example of an opening/closing unit. That is, the handle portion may be replaced with or may include an electric motor which interworks with an inner pot locking unit to lock the inner pot 1b by the user's manipulation.

In the following description, one side may refer to a direction toward an open end 17 of the lid 10 and the other side may refer to a direction toward a hinge connection part 16 of the lid 10.

The handle portion 11 is provided to interwork with an inner pot locking unit configured to lock the inner pot 1b. The inner pot locking unit may include a locking ring 20 rotatably coupled to a lower surface of the inner lid portion 10b and selectively locked to the flange portion depending on a rotational angle thereof, but the present disclosure is not limited thereto.

For example, each of a plurality of locking protrusions 21 protrude radially inward from an inner periphery of the locking ring 20 to correspond to one of the flange portions. In this case, when the locking ring 20 is rotated at an unlocking angle, each locking protrusion 21 is disposed in a space between the flange portions, and the lid 10 is separated from the inner pot 1b so that the lid 10 may be opened. In addition, when the locking ring 20 is rotated at a locking angle in a state in which the lid 10 is closed, each locking protrusion 21 is restrained by a lower end of the flange portion so that the lid 10 is locked with the inner pot 1b.

Referring to FIGS. 1 to 3A, a handle base portion 30 is connected to a lower end of the handle portion 11. In detail, the handle base portion 30 includes a support portion 30c as well as a locking ring interworking portion 30a and a lever interworking portion 30b which protrude from one end and the other end of the support portion 30c, respectively. The lower end of the handle portion 11 is coupled to an upper surface of the support portion 30c by means of a key, and a support protrusion 14 of the inner lid portion 10b is inserted into a rotation support groove 34 formed in a lower surface of the support portion 30c and rotatably supported therein. Accordingly, the handle base portion 30 can be rotated integrally with the handle portion 11 without twisting.

In addition, the locking ring interworking portion 30a extends to overlap with a rotational trace of the locking ring 20, and a connection hole 31 is formed in one side of the locking ring 20 overlapping with the locking ring 20. In this case, a connection protrusion 23 protruding from an upper surface of the locking ring 20 is inserted into the connection hole 31 through an arc-shaped elongated hole 15 of the inner lid portion 10b so that the locking ring 20 can be rotated together with the handle portion 11.

Meanwhile, a lead plate 80 is coupled to a lower surface of the inner lid portion 10b and an inner pot cover may be additionally attached to a lower surface of the lead plate 80.

In the present embodiment, as an example, a sealing packing 82 configured to seal an upper opening of the inner pot 1b is provided on the lower surface of the lead plate 80. However, the sealing packing 82 may be provided on an edge of an inner pot cover (not shown).

A plurality of steam flow holes are formed to pass through the other side of the inner pot cover (not shown) to discharge steam inside the inner pot 1b, and a plurality of communication holes 81a, 81b, and 81c are formed to pass through the lead plate 80 in a region facing the steam flow holes.

In addition, a control plate 70 having mounting holes 71a, 71b and 71c formed to pass therethrough and corresponding to the communication holes 81a, 81b and 81c is provided between the lead plate 80 and the inner lid portion 10b to collectively cover the communication holes 81a, 81b and 81c. Alternatively, the control plate 70 may be integrally formed with the lead plate 80.

Meanwhile, a plurality of upper perforation portions 13a, 13b and 13c are formed in the other side of the outer lid portion 10a to respectively correspond to the mounting holes 71a, 71b and 71c, and a lower perforation portion 13d having a size capable of covering a region of the upper perforation portions 13a, 13b and 13c is formed in the inner lid portion 10b.

In this case, the pressure switching unit 50 is arranged to pass through the lid 10 via one of the upper perforation portions 13a, 13b, and 13c and the lower perforation portion 13d such that the opened or closed state for discharging the steam can be selectively maintained. That is, the pressure switching unit 50 is configured to continuously maintain one of the opened and closed states during the cooking process.

In addition, the pressure-responsive operating unit 90 is arranged to pass through the lid 10 via the remaining upper perforation portions 13b and 13c and lower perforation portion 13d where the pressure switching unit 50 is not disposed. The pressure-responsive operating unit 90 includes a solenoid valve 90b that is opened or closed in response to an electrical signal, and a pressure relief valve 90a having a weight that is vertically lifted according to the steam pressure inside the inner pot 1b.

Specifically, the pressure-responsive operating unit 90 is selectively opened or closed in accordance with the pressure inside the inner pot 1b in the pressure cooking mode in which the pressure switching unit 50 is closed.

That is, when the pressure switching unit 50 is opened, cooking is performed in a non-pressure cooking mode in which the steam in the inner pot 1b is continuously discharged during the cooking. In contrast, when the pressure switching unit 50 is closed, the cooking is performed in a pressure cooking mode in which the internal pressure of the inner pot 1b is maintained at a constant level by the pressure-responsive operating unit 90.

To this end, an internal flow path of the pressure switching unit 50 may have a sectional area having a size that does not generate pressure in the inner pot 1b by discharging all the steam generated during the cooking.

In addition, a mounting groove 12 is recessed in an upper surface of the outer lid portion 10a along edges of the upper perforation portions 13a, 13b and 13c and a steam cap portion 60 configured to guide the discharge of steam from the pressure-responsive operating unit 90 and the pressure switching unit 50 may be detachably mounted in the mounting groove 12.

The steam cap portion 60 is formed, at the other side thereof, with a weight receiving hole 63 configured to surround an outer periphery of the pressure relief valve 90a and formed therein with a guide space 61 where upper ends of the pressure switching unit 50 and the solenoid valve 90b are disposed.

In this case, the steam of the pressure relief valve 90a collides with an inner wall surface of the weight receiving hole 63 and is discharged to the outside while being decelerated. In addition, the steam of the pressure switching unit 50 and the solenoid valve 90b collides with flow control ribs (not shown) protruding into the guide space 61 and is discharged to the outside through a steam guide hole 62 formed in the other end of the guide space 61 while being decelerated. As a result, accidents such as burns due to the rapid discharge of the high-temperature/high-pressure steam and steam emission noise can be minimized.

The main body 1a may be provided with an auxiliary locking unit for locking a locking protrusion 17a protruding from an open end 17 of the lid 10. Thus, the closed state of the lid 10 can be stably maintained when the locking ring 20 is unlocked even in the non-pressure cooking mode in which the pressure switching unit 50 is opened. Accordingly, the lid 10 can be prevented from being opened or disturbed due to the steam pressure during the cooking so that the inner pot 1b and the inner pot cover can be maintained in close contact with each other. Thus, the steam in the inner pot 1b can be safely discharged through the pressure switching unit 50 and the steam cap portion 60.

The pressure switching unit 50 may include a lower cylinder 53, a lifting piston 52, an upper cylinder 51, and a pressing unit.

The lower cylinder 53 has a hollow cylindrical shape and a pressure switching passage 53a is formed in the lower cylinder 53. The lower cylinder 53 is disposed to pass through the lower perforation portion 13d. As a lower end of the lower cylinder 53 is closely coupled to the communication hole 81a, the pressure switching passage 53a communicates with an inner side of the inner pot 1b.

In detail, a D-cut coupling portion 53c is formed at a lower end of the lower cylinder, and the communication hole 81a facing the lower cylinder 53 may be configured as a D-cut hole having a D-cut section corresponding to the D-cut coupling portion 53c. Accordingly, an outer periphery of the D-cut coupling portion 53c is matched with and supported on the inner periphery of the D-cut hole so that the rotation of the lower cylinder 53 caused by the steam pressure can be prevented.

In this case, the D-cut coupling portion 53c is inserted into the D-cut hole in a state in which a sealing O-ring 59 is fitted onto the outer periphery of the D-cut coupling portion 53c, and a screw thread is formed on an inner periphery of the D-cut coupling portion 53c being inserted into the D-cut hole so that the D-cut coupling portion 53c can be screw-coupled with an outer periphery of a cylinder cap 58.

In addition, a plurality of steam discharge holes 58b are formed to pass through the cylinder cap 58 to allow the steam in the inner pot 1b to flow outward and a fastening step 58a is formed along an outer periphery of the cylinder cap 58 to engage with a lower end edge of the D-cut hole. The steam discharge holes 58b may be arranged in a rotationally symmetrical configuration about the center of area of the cylinder cap 58 so that the cylinder cap 58 can be easily rotated using a snap ring plier or the like.

When the cylinder cap 58 is coupled to the D-cut coupling portion 53c, an edge of the D-cut hole is engaged between the fastening step 58a and a lower end of the lower cylinder 53 so that the lower cylinder 53 can be fixed. In addition, a gap between the lower end of the lower cylinder 53 and the edge of the D-cut hole can be sealed by the sealing O-ring 59. Accordingly, the steam in the inner pot 1b can be stably introduced into the pressure switching passage 53a without leakage. The cylinder cap 58 may be integrally formed with the communication hole 81a of the lead plate 80.

As shown in FIG. 5, the lower cylinder 153 may be fixed to the mounting hole of the control plate 170. That is, since a screw thread is formed on an outer periphery of a fixing fastening portion 153c provided at a lower end of the lower cylinder 153 and a screw thread is formed in an inner periphery of the mounting hole 171a, the fixing fastening portion 153c may be fastened to the mounting hole 171a. An O-ring fixing step 153e supported on an edge of the mounting hole 171a may be provided on an outer periphery of an upper end of the fixing fastening portion 153c. When the fixing fastening portion 153c is engaged with the inner periphery of the mounting hole 171a in a state in which the sealing O-ring 159a is mounted on the lower portion of the O-ring fixing step 153e, a gap between the lower cylinder 153 and the mounting hole 171a can be sealed.

In addition, a sealing member 159b is disposed at a lower end of the fixing fastening portion 153c to seal a gap between edges of the fixing fastening portion 153c and the communication hole 181a and to fix the lower cylinder 153. Thus, the steam in the inner pot 1b can be stably introduced toward the pressure switching passage without leakage, and the lower cylinder 153 and the pressure-responsive operating unit 90 may be collectively combined with one component and fixed thereto.

Further, the lower cylinder may be fixed by fitting the lower cylinder into the mounting hole 171a. In order to prevent steam leakage when the pressure switching passage communicates with the communication hole, the mounting positions of the sealing O-ring and the sealing member may be changed.

In addition, the lifting piston 52 is movably coupled to an upper portion of the lower cylinder 53, and the pressure switching passage 53a is opened and closed as the lifting piston 52 vertically moves.

The lifting piston 52 has a mounting plate portion 52a having a size greater than a size of the pressure switching passage 53a and mounted on an upper end of the lower cylinder 53 and has upper and lower slide tube portions 52c and 52b extending in the vertical direction from an outer end of the mounting plate portion 52a.

A shielding protrusion 52f configured to shield the pressure switching passage 53a is provided on a lower surface of the mounting plate portion 52a and a plurality of arc-shaped switching discharge holes 52e, which are divided along an outer contour of the shielding protrusion 52f, are formed to pass through the lower surface of the mounting plate portion 52a.

That is, an upper end of the pressure switching passage 53a is sealed by the shielding protrusion 52f when the lifting piston 52 moves downward, and the shielding protrusion 52f is spaced apart from an upper end of the pressure switching passage 53a when the lifting piston 52 moves upward so that the steam in the inner pot 1b may ascend by passing through the switching discharge hole 52e.

In addition, the upper cylinder 51 having a hollow cylindrical shape passes through the upper perforation portion 13a. A space between the upper cylinder 51 and the upper perforation portion 13a is sealed by a tubular sealing member 57, and a ring-shaped sealing groove 51c is recessed in an outer periphery of an upper end of the upper cylinder 51 so that a sealing protrusion 57a provided at an inner periphery of the tubular sealing member 57 can be hooked and supported in the ring-shaped sealing groove 51c.

Arc-shaped column fastening portions 51b are provided at a lower end of the upper cylinder 51, and a screw thread is formed on inner peripheries of the column fastening portions 51b. As the column fastening portions 51b are fastened to a screw thread formed on an upper outer periphery 53d of the lower cylinder 53 by passing through the switching discharge hole 52e, the upper cylinder 51 can be fixed to the lower cylinder 53. The column fastening portion 51b may have a size smaller than that of a sectional area of the switching discharge hole 52e to ensure a steam flow area when the lifting piston 52 moves upward.

An anti-scattering plate 51f may protrude radially inward from an inner periphery of the upper cylinder 51. The anti-scattering plate 51f may be formed at a position spaced from an upper surface of the switching discharge hole 52e when the lifting piston 52 moves upward and have a size covering the switching discharge hole 52e.

Thus, the steam can be smoothly discharged when a pressure switching unit 50 is opened, and it is possible to prevent water condensed on an inner surface of the pressure switching passage 53a from being scattered and discharged together with the steam. Therefore, an accident, such as burns caused by scattered moisture, can be prevented and contamination on a surface of the lid 10 or an interior of the steam cap portion 60 caused by sticky rice water can be minimized so that the electric cooker can be used safely and cleanly.

Meanwhile, the lower slide tube portion 52b has an inner diameter greater than an outer diameter of an upper portion of the lower cylinder 53 and the upper slide tube portion 52c has an inner diameter greater than an outer diameter of a lower portion of the upper cylinder 51. Therefore, the lifting piston 52 may be mounted to surround an outer periphery of the lower cylinder 53 and an outer periphery of the upper cylinder 51. Thus, the slide tube portions 52b and 52c are guided along the outer peripheries of the upper and lower cylinders 51 and 53 so that the lifting piston 52 may vertically move in the correct direction and the opened and closed states of the pressure switching passage can be stably switched.

In addition, ring-shaped sealing grooves 51d and 53b are recessed in a lower outer periphery of the upper cylinder 51 and an upper outer periphery of the lower cylinder 53 to mount the sealing members 55 and 56. A plurality of sealing ribs 55a and 56a may protrude from outer peripheries of the sealing members 55 and 56. Accordingly, even when the lifting piston 52 moves upward or downward, spaces between the slide tube portions 52b and 52c and between the cylinders 51 and 53 can be accurately sealed.

Further, since inner peripheries of the upper and lower ends of the lifting piston 52 are supported by end portions of the sealing ribs 55a and 56a, the radial movement is minimized so that the lifting piston 52 can more accurately vertically move. Accordingly, the shielding protrusion 52f and the pressure switching passage 53a can be concentrically aligned so that the pressure switching passage 53a can be accurately opened and closed.

Meanwhile, a lifting blade portion 52d may protrude radially outward from an outer periphery of the lower slide tube portion 52b. The lifting blade portion 52d is pressed downward by the pressing unit so that the pressure switching passage 53a can be maintained in a closed state. The pressing unit may be provided as an elastic member 54, such as a spring having an elastic modulus corresponding to the abnormal pressure so that the pressure switching passage 53a is forcibly opened at a predetermined abnormal pressure or above.

In detail, a spring support protrusion 51a is provided on an outer periphery of the upper cylinder 51 and a washer member 51e having a size greater than a diameter of the elastic member 54 is attached to a lower end of the spring support protrusion 51a. The washer member 51e may be integrally formed with the spring support protrusion 51a, and the spring support protrusion 51a may have an area corresponding to the diameter of the elastic member 54.

Since the elastic member 54 is interposed between the lifting blade portion 52d and the washer member 51e, the shielding protrusion 52f and the pressure switching passage 53a can be maintained in a close contact state.

As shown in FIG. 4, the pressing unit may be provided in the form of a pressure load pendulum 154 having a weight corresponding to the abnormal pressure and coupled to an outer periphery of the lifting piston 152. The pressure load pendulum 154 may have a ring shape and may be mounted on an upper surface of the lifting blade portion 152d or be integrally formed with the lifting blade portion 152d. The abnormal pressure may be set to a level greater than the internal pressure of the inner pot 1b controlled by the pressure-responsive operating unit 90 in the pressure cooking mode.

That is, when the internal pressure of the inner pot 1b is controlled by the pressure-responsive operating unit 90 in a state in which the pressure switching passage 53a is closed, the lifting piston 52 is maintained in a descended state due to the downward pressing force of the pressing units 54 and 154, and the pressure switching passage 53a is c When the internal pressure of the inner pot 1b is excessively increased due to a control error or a failure of the pressure-responsive operating unit 90, the shielding protrusion 52f may ascend due to the increased steam pressure, thereby forcefully opening the pressure switching passage 53a. Thus, an accident caused by excessive pressure increase in the inner pot 1b can be prevented.

The pressure switching passage 53a is configured to be narrowed radially inward toward the upward direction. Accordingly, a pressure area of the steam with respect to the shielding protrusion 52f can be reduced, and the pressure required for the pressing unit 54 to maintain the descended state of the lifting piston 52 can be reduced.

The shielding protrusion 52f may be configured to be narrowed radially inward in the downward direction and an expanded sealing contact portion 53f, which is expanded radially outward in the upward direction, is provided at an upper end of the pressure switching passage 53a. Accordingly, an inclined lower surface of the shielding protrusion 52f comes into surface-contact with an inclined inner surface of the sealing contact portion 53f when the lifting piston 52 moves downward so that the accurate contact can be achieved.

Meanwhile, a lift lever portion 40 is provided between the pressure switching unit 50 and the handle base portion 30 to move linearly to one side and the other side corresponding to the rotation of the lever interworking portion 30b. The lift lever portion 40 may be configured to move linearly in contact with an outer periphery of the pressure switching unit 50.

In detail, referring to FIGS. 1 and 2A, the lift lever portion 40 includes a connecting body portion 40c provided in a plate shape having an area covering a rotational trace of the lever interworking portion 30b, and first and second lever body portions 40a and 40b extending from the other end to come into contact with both sides of an outer periphery of the pressure switching unit 50.

The first lever body portion 40a and the second lever body portion 40b are disposed along an outer periphery of the pressure switching unit 50, and extend more than a linear movement distance of the lift lever portion 40 to maintain an overlap state with the lifting blade portion 52d when the linear movement is performed.

In addition, an elongated guide hole 44a is formed to pass through one end of the first lever body portion 40a adjacent to the connecting body portion 40c. The elongated guide hole 44a may be configured to extend in one direction and the other direction of the lid 10.

When the screw member 18c is fastened to the inner lid portion 10b by passing through the elongated guide hole 44a, a washer member provided at a head portion of the screw member 18c supports an upper edge of the elongated guide hole 44a. Thus, an inner surface of the elongated guide hole 44a is guided along an outer periphery of the screw member 18c so that the lift lever portion 40 can move linearly to one side and the other side.

In addition, a crank hole 41 is formed to pass through the connecting body portion 40c such that one end of a rotational trace of an interworking protrusion 32 protruding from a lower end of the lever interworking portion 30b may be inserted into the crank hole 41. The crank hole 41 extends in a tangential direction from one end of a rotational trace of the interworking protrusion 32. The rotational trace of the interworking protrusion 32 refers to a curve defined between a position of the interworking protrusion 32 when the locking ring 20 is locked and a position of the interworking protrusion 32 when the locking ring 20 is unlocked. The one end of the rotational trace may signify the position of the interworking protrusion 32 when the locking ring 20 is locked. That is, the crank hole 41 is formed in a direction perpendicular to the elongated guide hole 44a from the position of the interworking protrusion 32 when the locking ring 20 is locked.

Accordingly, when the handle base portion 30 is rotated, the interworking protrusion 32 moves in the lateral direction along the inside of the crank hole 41 while forming an arc, and pulls one side edge of the crank hole 41 so that the lift lever portion 40 can move linearly to the one side. When the handle base portion 30 is rotated in reverse, the interworking protrusion 32 moves in the opposite direction while forming an arc and pushes the other edge of the crank hole 41 so that the lift lever portion 40 can move linearly to the other side. A fitness safety device 90c may be provided at the lower perforation portion 13d corresponding to a lower portion of the first lever body portion 40a, and a fitness restricting hole 42 is formed in first lever body portion 40a.

In detail, the fitness restricting hole 42 may be formed in a position facing a safety pin of the fitness safety device 90c in a state in which the handle base portion 30 is rotated to lock the locking ring 20 and the first lever body portion 40a is moved to the other side.

The safety pin ascends in a state in which an internal pressure of the inner pot 1b is higher than a preset safety pressure. As the safety pin is inserted into the fitness restricting hole 42 and the linear movement of the first lever body portion 40a is restricted, at the same time, the movement of the interworking protrusion 32 is restricted.

Accordingly, the rotation of the handle base portion 30 is restricted and the locking ring 20 is prevented from being unlocked when the internal pressure of the inner pot 1b is higher than the safety pressure, so the accident, such as the leakage of the high-pressure steam due to erroneous operation of the handle portion 11 and burns caused by the leakage of the high-pressure steam can be prevented.

In addition, a lift protrusion portion 43 protrudes from upper surfaces of the first lever body portion 40a and the second lever body portion 40b along an edge portion which is in contact with an outer periphery of the pressure switching unit 50 when the lift lever portion 40 is moved linearly.

The lift protrusion portion 43 may be formed along a portion facing the lifting blade portion 52d when the lift lever portion 40 is moved linearly, and the lift protrusion portion 43 is inclined upward in the linear movement direction when the handle portion 11 is rotated to be locked.

That is, the lift protrusion portion 43 has a low projecting height at a portion facing a lower surface of the lifting blade portion 52d in the locked state of the handle portion 11, and has a high projecting height at the portion facing the lower surface of the lifting blade portion 52d in the unlocked state of the handle portion 11.

In detail, when the handle portion 11 is rotated to be locked, a height of a lowermost step 43a provided at one end of the lift protrusion portion 43 facing the lifting blade portion 52d is set such that the shielding protrusion 52f moves downward to close the pressure switching passage 53a.

In addition, when the handle portion 11 is rotated to be unlocked, a height of an uppermost step 43b formed at the other end of the lift protrusion portion 43 facing the lifting blade portion 52d is set such that a sufficient steam flowing area may be formed between the shielding protrusion 52f and the pressure switching passage 53a.

Accordingly, the opened/closed states of the pressure switching unit 50 can be switched corresponding to the rotation of the handle portion 11.

That is, as shown in FIGS. 2A and 3A, when the handle portion 11 is rotated to be unlocked in a state in which the lift lever portion 40 is moved to the other side, the lift lever portion 40 is pulled to one side, and the lifting blade portion 52d slides upward along an inclined surface of the lift protrusion portion 43.

A lower end edge 52g of the lifting blade portion 52d may be rounded to allow the lift protrusion portion 43, which is in contact with the lift lever portion 40 when the lift lever portion 40 is moved, to slide smoothly.

In addition, when the lifting blade portion 52d is supported by the uppermost step 43b of the lift protrusion portion 43, the pressure switching passage 53a can be completely opened and the opened state can be maintained.

In this case, the steam in the inner pot 1b can be discharged to the outside through the steam flow hole, the steam discharge hole 58b, the communication hole 81a, the pressure switching passage 53a, the switching discharge hole 52e, a hollow of the upper cylinder 51, and the steam cap portion 60. Accordingly, the cooking can be performed in the non-pressure cooking mode in which the steam in the inner pot 1b is continuously discharged and the internal pressure of the inner pot 1b is not increased.

In addition, as shown in FIGS. 2B and 3B, when the handle portion 11 is rotated to be locked in a state in which the lift lever portion 40 has moved to one side, the lift lever portion 40 is pushed to the other side and the lifting blade portion 52d slides down along an inclined surface of the lift protrusion portion 43. When the lifting blade portion 52d faces the lowermost step 43a of the lift protrusion portion 43, upward pressure on the lifting blade portion 52d is released so that the lifting piston 52 moves downward and the pressure switching passage is completely closed.

In this case, since the descended state of the lifting piston 52 is maintained by the pressing unit 54, the steam in the inner pot 1b flows to the pressure-responsive operating unit 90 through the steam flow hole, and is selectively discharged depending on the level of the internal pressure of the inner pot 1b so that the internal pressure of the inner pot 1b can be maintained at a constant level.

That is, since the internal pressure of the inner pot 1b is increased in a state in which the pressure switching unit 50 is closed, the cooking can be performed in the pressure cooking mode. When the internal pressure of the inner pot 1b is increased higher than a predetermined level, the steam in the inner pot 1b can be discharged to the outside through the steam flow hole, the pressure-responsive operating unit 90, and the steam cap portion 60.

In this manner, since the non-pressure cooking mode for cooking a food without pressure and the pressure cooking mode for cooking a food with high pressure, such as pressure rice cooking, can be easily switched according to the opening and closing of the pressure switching unit 50, various recipes can be freely used in one cooking device. In addition, since a food may be cooked according to the user's taste, such as cooking a unique sticky texture of pressure cooked rice or a unique soft texture of non-pressure cooked rice, the compatibility of the product and the cooking quality can be improved.

Further, since the pressure safety device such as the fitness safety device 90c is not driven in the non-pressure cooking mode, the lid 10 can be freely opened and closed so that the input of additional material and checking of cooking conditions can be easily performed during cooking, thereby improving the convenience of use for the product.

In addition, since the opened/closed states of the pressure switching unit 50 are switched by simply rotating the handle portion 11, the non-pressure cooking mode and the pressure cooking mode can be easily selected during use and the convenience of use for the product can be significantly improved. Further, since the lift lever portion 40 for interworking the handle portion 11 and the pressure switching unit 50 performs the function of preventing the opening of the inner pot 1b at the high pressure state, the number of components can be reduced so that the assembling work can be improved.

In addition, the steam in the inner pot 1b can be quickly discharged through a wide flow path formed in the pressure switching unit 50 by simply rotating the handle portion 11 in the unlocking direction. Therefore, a conventional structure, such as a tumbler pin, for forcibly opening the pressure relief valve 90a in order to remove the residual pressure in the inner pot 1b may be omitted. Further, in the non-pressure cooking mode, the steam exhaust noise generated from the pressure relief valve 90a during the cooking may be removed, so the quietness of the product can be improved.

In this manner, the lifting blade portion vertically moves along the inclined surface of the lift protrusion portion provided in a unit interlocking with the rotation of the handle portion, thereby switching the opened/closed states of the pressure switching passage.

Referring to FIGS. 1 to 6, the locking ring 20 may have a pair of markers 22a and 22b which are spaced apart from each other in a locking direction and an unlocking direction to notify a user of the rotation direction.

The markers 22a and 22b may be provided as permanent magnets, and a pair of sensor units 18a and 18b may be installed on the inner lid portion 10b to sense the magnetic force of the markers 22a and 22b, respectively.

In detail, the first sensor unit 18a and the second sensor unit 18b are installed on an upper surface of the inner lid portion 10b corresponding to the rotational trace of the markers 22a and 22b. The first sensor unit 18a is arranged corresponding to the position of the first marker 22a located in the locking rotation direction of the locking ring 20 when the locking ring 20 is locked, and the second sensor unit 18b is arranged corresponding to the position of the second marker 22b located in the unlocking rotation direction of the locking ring 20 when the locking ring 20 is unlocked.

When the locking ring 20 is locked, the first sensor unit 18a senses the magnetic force of the first marker 22a and transmits a sensing signal. When the locking ring 20 is unlocked, the second sensor unit 18b senses the magnetic force of the second marker 22b and transmits a sensing signal.

When the handle portion 11 is rotated to lock the locking ring 20, the pressure switching unit 50 is closed corresponding to the rotation of the handle portion 11, and the pressure switching unit 50 is opened when the handle portion 11 is rotated to unlock the locking ring 20.

In this case, the sensing signals of the sensor units 18a and 18b are transmitted to a control unit 19a, and the control unit 19a controls to activate power supply to the main body 1a when the control unit 19a receives the sensing signal from at least one of the sensor units 18a and 18b.

That is, when the power supply to the main body 1a is activated, a heating unit 19c configured to heat the inner pot 1b according to a cooking command input through a control panel 19b provided in the main body 1a may be driven. Accordingly, a food contained in the inner pot 1b can be cooked not only in the pressure cooking mode in which the pressure switching unit 50 is closed, but also in the non-pressure cooking mode in which the pressure switching unit 50 is opened.

The control unit 19a may inactivate the power supply to the main body 1a when the sensing signal is not received.

Therefore, the power supply to the main body 1a may be activated only when the locking ring 20 is locked to completely close the pressure switching unit 50 or when the locking ring 20 is unlocked to completely open the pressure switching unit 50.

That is, it is possible to prevent the food from being cooked in a state in which the pressure switching unit 50 is partially opened or closed, thereby preventing degradation of cooking quality and occurrence of accidents.

In addition, the control unit 19a controls a cooking temperature of the inner pot 1b through a control algorithm of a preset pressure cooking mode when the cooking command is input in a state in which the sensing signal corresponding to the locking of the locking ring 20 is received. In this case, the control unit 19a may control the amount of heating of the heating unit 19c to maintain the cooking temperature suitable for pressure cooking for pressure cooked rice and the like.

When the cooking command is input in a state in which the sensing signal corresponding to the unlocking of the locking ring 20 is received, the control unit 19a controls the amount of heating of the heating unit through the control algorithm of the preset non-pressure cooking mode. In this case, the control unit 19a may control the amount of heating of the heating unit 19c to maintain the cooking temperature suitable for the non-pressure cooking for the non-pressure cooked rice and the like.

Accordingly, the locking and unlocking of the locking ring 20 may be switched, and at the same time, the opened/closed states of the pressure switching unit 50 may be switched by simply rotating the handle portion 11. In addition, the cooking temperature control algorithm suitable for the pressure/non-pressure cooking mode can be automatically selected so that the product can be conveniently used and the cooking quality can be markedly improved.

Figure 7:
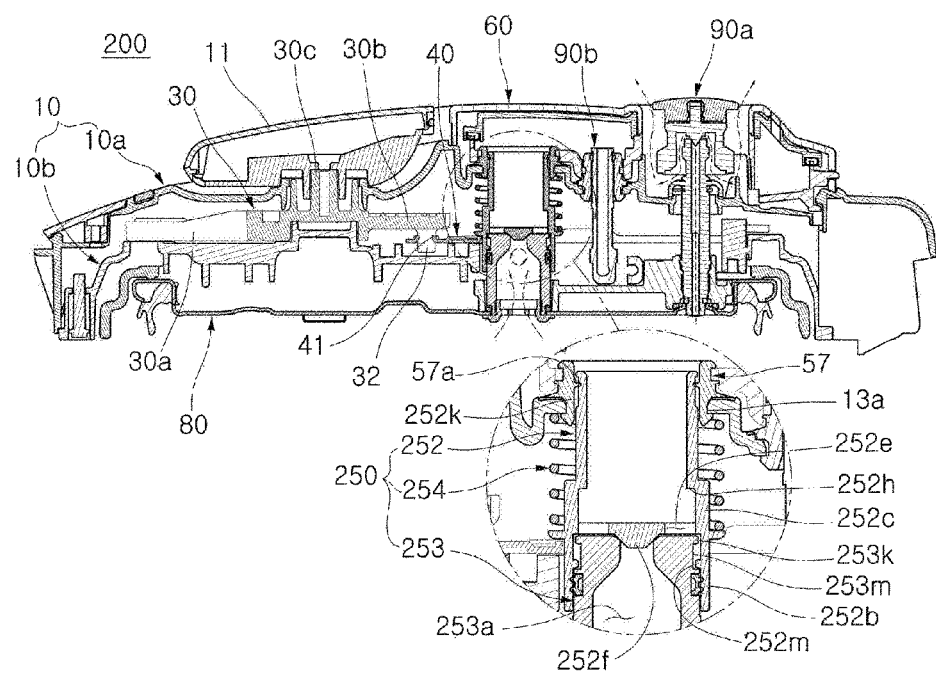
FIG. 7 is a sectional view illustrating a lid of an electric cooker according to a second embodiment of the present disclosure.

FIG. 7 is a sectional view illustrating a lid of an electric cooker according to a second embodiment of the present disclosure. In the second embodiment, the basic configuration except for the shape of the lifting piston 252 is the same as that of the first embodiment described above, so a detailed description of the same configuration will be omitted, and the same configurations will be denoted by the same reference numerals.

As shown in FIG. 7, a pressure switching unit 250 may include a lower cylinder 253, a lifting piston 252, and a pressing unit. The lifting piston 252 is disposed to pass through an upper perforation portion 13a, and is coupled to an upper portion of the lower cylinder 253 to vertically move.

In detail, a tap assembling protrusion 252m protrudes from a lower inner periphery of a lower slide tube portion 252b, and a tap fitting protrusion 253k and a protrusion receiving groove 253m are formed on an outer periphery of an upper end of the lower cylinder 253.

The tap assembling protrusion 252m may be formed at an inner periphery of a lower slide tube portion 252b with a screw thread and the tap fitting protrusion 253k may be formed at an outer periphery of an upper end of the lower cylinder 253 with a screw thread so that the tap assembling protrusion 252m can be coupled with the tap fitting protrusion 253k. The protrusion receiving groove 253m has a longitudinal width corresponding to a lifting distance of the lifting piston 252 along a lower portion of the tap fitting protrusion 253k.

That is, the tap assembling protrusion 252m moves downward while being rotatably coupled to the tap fitting protrusion 253k and may be inserted into the protrusion receiving groove 253m by passing through the screw thread of the tap fitting protrusion 253k. In this case, the tap assembling protrusion 252m may vertically move within a range from a lower end of the tap fitting protrusion 253k to an inside of the protrusion receiving groove 253m.

Accordingly, the lifting piston 252 is coupled to the upper portion of the lower cylinder 253 to vertically move and can be prevented from being separated from the lower cylinder 253 due to the steam being discharged when the pressure switching unit 250 is opened.

In addition, the upper slide tube portion 252c extends by passing through the upper perforation portion 13a. That is, the upper slide tube portion 252c may have a length allowing the upper slide tube portion 252c to be exposed to an upper side of the upper perforation portion 13a in a state in which the shielding protrusion 252f is in close-contact with an upper end of the switching passage 253a.

In this case, the pressing unit may be provided as an elastic member 254 or a pressure load pendulum the same as in the first embodiment. When the pressing unit is provided as the elastic member 254, an upper end of the elastic member 254 can be supported on a lower edge of the upper perforation portion 13a.

In addition, a gap between the upper slide tube portion 252c and the upper perforation portion 13a is sealed by a tubular sealing member 57 and a ring-shaped sealing groove 252k is recessed in an outer periphery of an upper end of the upper slide tube portion 252c so that a sealing protrusion 57a provided at an inner periphery of the tubular sealing member 57 may be hooked and supported in the ring-shaped sealing groove 252k.

The sealing groove 252k may extend in the vertical direction corresponding to the lifting distance of the lifting piston 252. Accordingly, the sealed state between the sealing protrusion and the sealing groove 252k can be stably maintained even when the lifting piston 252 vertically moves.

When the lifting piston 252 moves upward, the steam in the inner pot 1b can be discharged out of the lid 10 through a steam flow hole, a steam discharge hole 58b, a communication hole 81a, the pressure switching passage 253a, a switching discharge hole 252e, the upper slide tube portion 252c and a steam cap portion 60. An anti-scattering step portion 252h may be formed on an inner periphery of the upper slide tube portion 252c to cover an upper portion of the switching discharge hole 252e.

In this manner, an inside of the inner pot 1b may communicate with an outside of the lid 10 without a separate upper cylinder (see reference numeral 51 in FIG. 1), and a sealing member (see reference numeral 55 in FIG. 1) configured to seal a gap between the upper cylinder and the upper slide tube portion 252c when the lifting piston 252 vertically moves can be omitted so that the number of components can be reduced and the productivity and assembling work of the product can be improved.

Figure 8A:
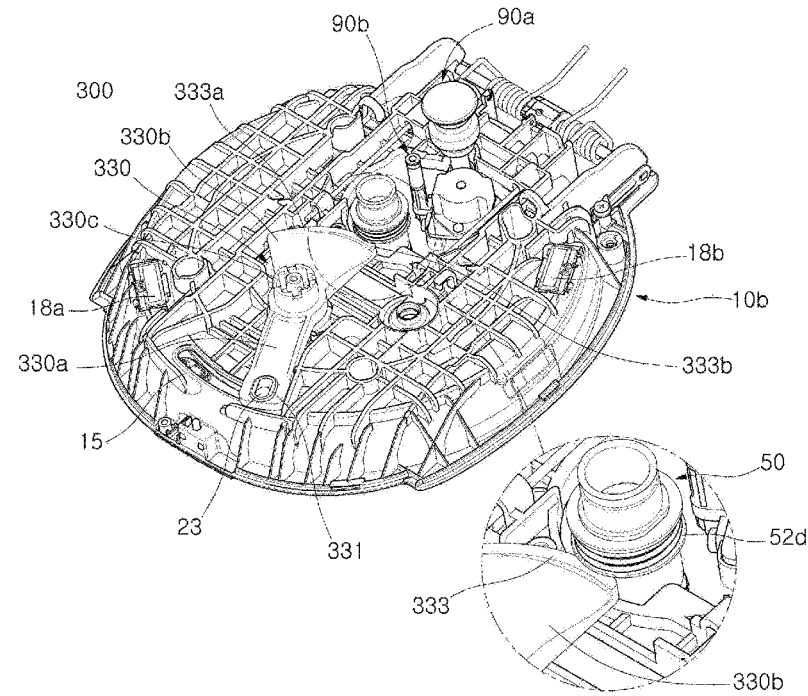
FIGS. 8A and 8B are perspective views illustrating opened and closed states of a pressure switching unit of an electric cooker according to a third embodiment of the present disclosure.
Figure 8B:
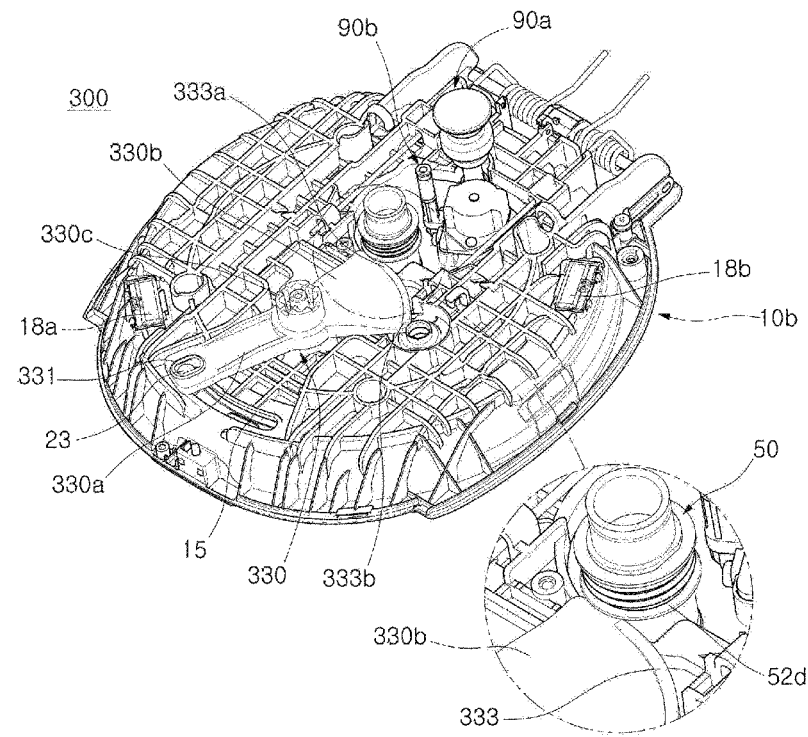
Figure 9A:
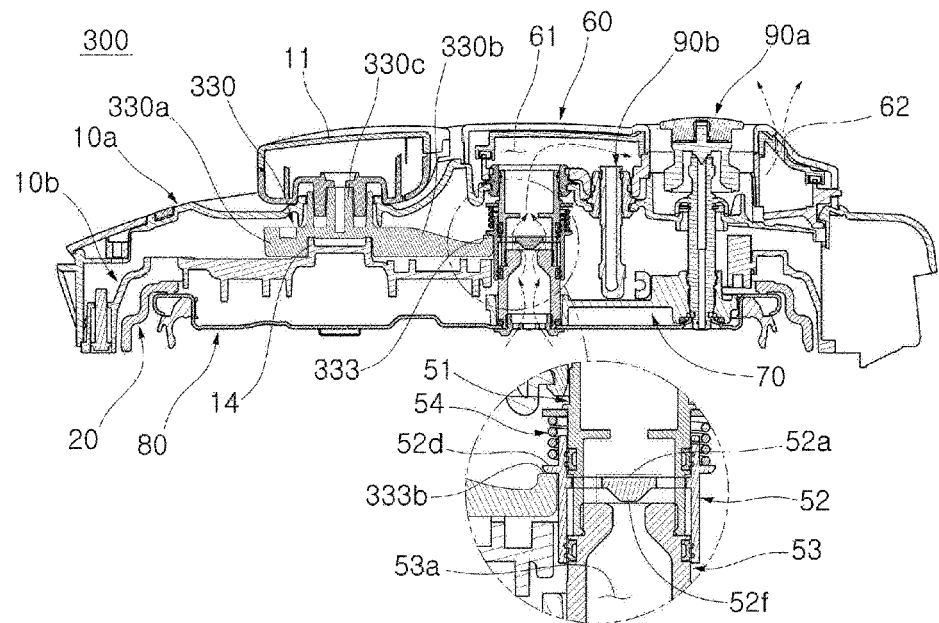
FIGS. 9A and 9B are sectional views illustrating opened and closed states of a pressure switching unit of an electric cooker according to the third embodiment of the present disclosure.
Figure 9B:
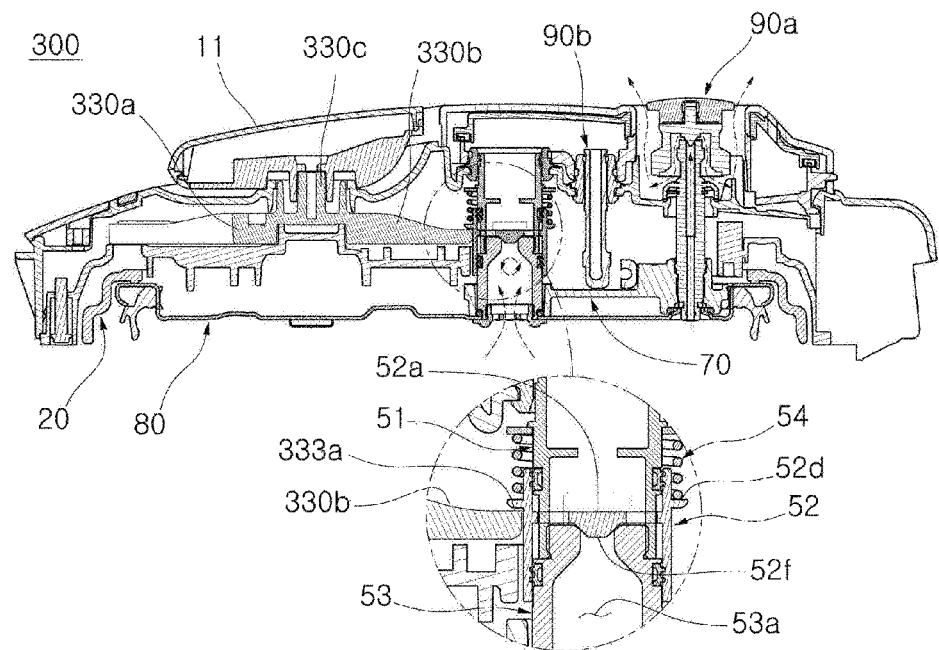

FIGS. 8A and 8B are perspective views illustrating opened and closed states of a pressure switching unit of an electric cooker according to a third embodiment of the present disclosure and FIGS. 9A and 9B are sectional views illustrating opened and closed states of the pressure switching unit of the electric cooker according to the third embodiment of the present disclosure.

In the third embodiment, the basic structure is the same as that of the first embodiment or the second embodiment described above except that a handle base portion 330 extends toward a pressure switching unit 50 to replace a lift lever, and a lift protrusion portion 333 is integrally formed on an upper surface of the extension portion, so a detailed description of the same configurations will be omitted, and the same configurations will be denoted by the same reference numerals.

As shown in FIGS. 8A to 9B, the handle base portion 330 includes a support portion 330c, locking ring interworking portions 330a protruding from one end and the other end of the support portion 330c, and a piston interworking portion 330b.

The piston interworking portion 330b extends so as to rotate in contact with an outer periphery of the pressure switching unit 50 when the handle base portion 330 is rotated. That is, the piston interworking portion 330b has an arcuate edge extending in a shape of a sector and coming into contact with an outer periphery of the pressure switching unit 50.

Although not shown in the drawings, a fitness restricting lever having a shape similar to that of the lift lever portion in which the lift protrusion is removed may be provided at a lower portion of the piston interworking portion 330b. In addition, an interworking protrusion may be formed on a lower surface of the piston interworking portion 330b to allow the fitness restricting lever to move linearly to one side and the other side when the handle base portion 330 is rotated.

The lift protrusion portion 333 is formed on an upper surface of the arcuate edge of the piston interworking portion 330b along a rotational trace overlapping with a lifting blade portion 52d when the handle base portion 330 is rotated. The lift protrusion portion 333 may be gradually inclined upward in the locking rotation direction.

That is, the lift protrusion portion 333 has a high projecting height at a portion facing a lower surface of the lifting blade portion 52d in the unlocked state of the handle portion, and has a low projecting height at the portion facing the lower surface of the lifting blade portion 52d in the locked state of the handle portion.

In this case, when the handle portion is rotated to be locked, a height of a lowermost step 333a of the lift protrusion portion 333 facing the lifting blade portion 52d is set such that the shielding protrusion 52f moves downward to close the pressure switching passage 53a.

Further, when the handle portion is rotated to be unlocked, a height of an uppermost step 333b of the lift protrusion portion 333 facing the lifting blade portion 52d is set such that a sufficient steam flow area may be formed between the shielding protrusion 52f and the pressure switching passage 53a.

In detail, as shown in FIGS. 8A and 9A, when the uppermost step 333b of the lift protrusion portion 333 is disposed on a lower surface of the lifting blade portion 52d, the lifting blade portion 52d is pressed upward so that the pressure switching unit 50 is opened. Thus, the steam in the inner pot 1b is continuously discharged into an internal passage of the pressure switching unit 50 so that the food can be cooked in a non-pressure state.

In addition, as shown in FIGS. 8B and 9B, when the lowermost step 333a of the lift protrusion portion 333 is disposed on a lower surface of the lifting blade portion 52d, the lifting blade portion 52d is pressed downward by the pressing unit so that the pressure switching unit 50 can be closed.

In this case, since the lifting piston 52 is maintained in a descended state by the pressing unit, the steam in the inner pot 1b is selectively discharged by the pressure-responsive operating unit 90 when the inner pot 1b is heated so that the food can be cooked in a pressure state.

In addition, since the non-pressure cooking mode and the pressure cooking mode can be easily selected during use by simply rotating the handle portion, the convenience of use for the product can be significantly improved. Further, since the lift protrusion portion 333 for interworking the handle portion and the pressure switching unit 50 is integrally formed with the handle base portion 330, the number of components can be reduced and the interconnecting structure between the components can be simplified so that the productivity may be improved and assembling work may be simplified.

The present disclosure provides the following effects.

First, since the non-pressure cooking mode for cooking a food without pressure and the pressure cooking mode for cooking a food with high pressure such as pressure rice cooking can be easily switched according to the opening and closing of the pressure switching unit, various recipes can be freely used with one cooking device. In addition, since it is possible to cook a food according to the user's taste, such as a unique sticky texture of pressure cooked rice and a unique soft texture of non-pressure cooked rice, the compatibility of the product and the cooking quality can be improved.

Further, since the lid can be freely opened and closed in the non-pressure cooking mode without the limitation caused by the pressure safety device, the input of the additional material and the checking of the cooking condition can be easily performed during the cooking, thereby improving the convenience of use for the product.

Second, since the opened/closed states of the pressure switching unit are switched corresponding to the rotation of the handle portion, the non-pressure cooking mode and the pressure cooking mode can be easily selected during use by simply rotating the handle portion so that the convenience of use for the product can be significantly improved.

Third, the pressing unit for maintaining the lifting piston in the descended state is configured to have an elastic force or a load corresponding to a preset abnormal pressure. Therefore, the pressure switching passage can be stably closed at the time of pressure cooking, and the pressure switching channel can be forcibly opened when the internal pressure of the inner pot 1b is excessively increased due to the malfunction of the pressure-responsive operating unit so that the safety of the product can be improved.

Fourth, since the switching discharge hole of the lifting piston is covered with the anti-scattering plate or the anti-scattering step, water condensed on the inner surface of the pressure switching passage can be prevented from being scattered and discharged together with the steam. Therefore, an accident caused by scattered moisture can be prevented and contamination on the lid or the steam cap portion caused by sticky rice water can be minimized so that the electric cooker can be used safely and cleanly.

Fifth, when the locking ring is locked and unlocked, the control unit determines the opened/closed states of the pressure switching unit through the sensing signal of the sensor unit according to the position of the marker. That is, the cooking temperature control algorithm suitable for the non-pressure cooking mode and the pressure cooking mode, which are switched according to the rotation of the handle portion, can be automatically selected so that the convenience of use for the product and the cooking quality of the product can be remarkably improved.

It will be apparent to those skilled in the art that various modifications can be made to the above-described exemplary embodiments of the present disclosure without departing from the spirit or scope of the disclosure. Thus, it is intended that the present disclosure covers all such modifications provided they come within the scope of the appended claims and their equivalents.

What is claimed is:

1. An electric cooker comprising:
   a main body configured to accommodate an inner pot;
   a lid coupled to an upper portion of the main body and having a handle portion provided at one side of an upper portion of the lid to interwork with an inner pot locking unit configured to lock the inner pot;
   a pressure switching unit arranged to pass through the lid and configured to switch or maintain an opened or closed state to discharge internal steam from the inner pot according to a rotation of the handle portion;
   a pressure-responsive operating unit which is selectively opened or closed according to a pressure inside the inner pot in a pressure cooking mode in which the pressure switching unit is closed;
   a handle base portion rotatably connected to a lower end of the handle portion, and having a locking ring interworking portion at one end thereof and a lever interworking portion at the other end thereof; and
   a lift lever portion configured to move linearly to one side and the other side according to a rotation of the lever interworking portion.

2. The electric cooker of claim 1, wherein a crank hole is formed to pass through one end of the lift lever portion such that an interworking protrusion protruding from the lever interworking portion is inserted into the crank hole, and extends in a tangential direction from one end of a rotational trace of the interworking protrusion.

3. The electric cooker of claim 1, wherein the lift lever portion is configured to move linearly in contact with an outer periphery of the pressure switching unit, and
   the lift lever portion has a lift protrusion portion which protrudes from an upper surface of the lift lever portion along a portion in contact with the outer periphery of the pressure switching unit when the lift lever portion moves linearly and is gradually inclined upward in a linear movement direction of the lift lever portion when the handle portion is rotated to be locked.

4. The electric cooker of claim 1, further comprising a handle base portion rotatably connected to a lower end of the handle portion, wherein the handle base portion has a locking ring interworking portion at one end thereof and a piston interworking portion at the other end thereof.

5. The electric cooker of claim 4, wherein the piston interworking portion extends so as to be rotated in contact with an outer periphery of the pressure switching unit when the handle portion is rotated, and
   the piston interworking portion has a lift protrusion portion which protrudes from an upper surface of the piston interworking portion along a portion in contact with the outer periphery of the pressure switching unit when the piston interworking portion is rotated, and is gradually inclined upward in a rotational direction of the handle portion to be locked.

6. The electric cooker of claim 1, wherein the pressure switching unit comprises:
   a lower cylinder configured to pass through a lower surface portion of the lid and formed therein with a pressure switching passage communicating with an inside of the inner pot;
   a lifting piston having a lifting blade portion which protrudes from an outer periphery of the lifting piston, and vertically moves along an inclined surface of a lift protrusion portion obliquely protruding upward from a member that moves according to a rotation of the handle portion to switch opened/closed states of the pressure switching passage; and
   a pressing unit coupled to an upper portion of the lower cylinder to press the lifting blade portion such that the opened/closed states of the pressure switching passage is maintained.

7. The electric cooker of claim 6, wherein an edge of the lifting blade portion is rounded such that the lift protrusion portion is slidable thereon.

8. The electric cooker of claim 6, wherein the pressing unit is installed on an outer periphery of the lifting piston to allow the pressure switching passage to be forcibly opened at a preset abnormal pressure or above, and is formed of an elastic member having an elastic modulus corresponding to the abnormal pressure.

9. The electric cooker of claim 6, wherein the pressing unit is a pressure load pendulum provided on an outer periphery of the lifting piston and having a weight corresponding to a preset abnormal pressure such that the pressure switching passage is forcibly opened at the preset abnormal pressure or above.

10. The electric cooker of claim 6, further comprising a control plate provided on a lower surface of the lid and having a plurality of mounting holes configured to collectively fix and support the pressure switching unit and the pressure-responsive operating unit,
    wherein a fastening portion, which is screw-coupled with an inner periphery of the mounting hole, is provided at a lower end of the lower cylinder.

11. The electric cooker of claim 6, wherein a D-cut coupling portion, which is fitted and inserted into a D-cut hole formed in a lead plate that covers a lower surface of the lid, is provided at a lower end of the lower cylinder.

12. The electric cooker of claim 6, wherein the lifting piston comprises:
    a mounting plate portion mounted on an upper end of the lower cylinder, in which a shielding protrusion configured to shield the pressure switching passage is formed on a lower surface of the mounting plate portion, and switching discharge holes are formed along an outer periphery of the shielding protrusion; and
    a lower slide tube portion extending downward from an outer end of the mounting plate portion to surround an outer periphery of the lower cylinder.

13. The electric cooker of claim 12, wherein the shielding protrusion is configured to be gradually narrowed inward radially in a downward direction, and
    a sealing contact portion is provided at an upper end of the pressure switching passage, in which the sealing contact portion is gradually expanded radially outward in an upward direction to come into contact with the shielding protrusion.

14. The electric cooker of claim 12, wherein a sealing member configured to seal an inner periphery of the lower slide tube portion is mounted on the outer periphery of the lower cylinder.

15. The electric cooker of claim 12, wherein a tap assembling protrusion protrudes from an inner periphery of the lower slide tube portion, and
    a tap coupling protrusion, to which the tap assembling protrusion is rotatably coupled, and a protrusion accommodating groove, which is expanded to have a longitudinal width corresponding to a lifting distance of the lifting piston and into which the tap assembling protrusion is inserted by passing through the tap coupling protrusion, are provided at the outer periphery of the lower cylinder.

16. The electric cooker of claim 12, wherein the lifting piston further comprises an upper slide tube portion extending upward from an outer end of the mounting plate portion and arranged to pass through an upper surface of the lid, and
wherein an anti-scattering step portion is formed on an inner periphery of the upper slide tube portion to cover an upper portion of the switching discharge hole.

17. The electric cooker of claim 12, wherein the pressure switching unit further comprises an upper cylinder arranged to pass through an upper surface of the lid, and
wherein a column fastening portion, which extends downward while being divided in an arc shape so as to be fastened to the lower cylinder by passing through the switching discharge hole, is provided at a lower end of the upper cylinder.

18. The electric cooker of claim 17, wherein the lifting piston further comprises an upper slide tube portion extending upward from an outer end of the mounting plate portion to surround an outer periphery of the upper cylinder, and
wherein a sealing member configured to seal an inner periphery of the upper slide tube portion is mounted on an outer periphery of the upper cylinder, and
an anti-scattering plate, which protrudes radially inward to face the switching discharge hole, is provided on an inner periphery of the upper cylinder.

19. The electric cooker of claim 1, wherein a steam cap portion is detachably coupled to an upper surface of the lid to guide discharge of steam from the pressure-responsive operating unit and the pressure switching unit,
the pressure-responsive operating unit includes a solenoid valve that is opened or closed in response to an electric signal and a pressure relief valve having a weight configured to vertically move according to a steam pressure in the inner pot, and
an auxiliary locking unit, which is configured to selectively lock the lid when the inner pot locking unit is unlocked, is provided in the main body.

* * * * *